United States Patent Office 3,420,679
Patented Jan. 7, 1969

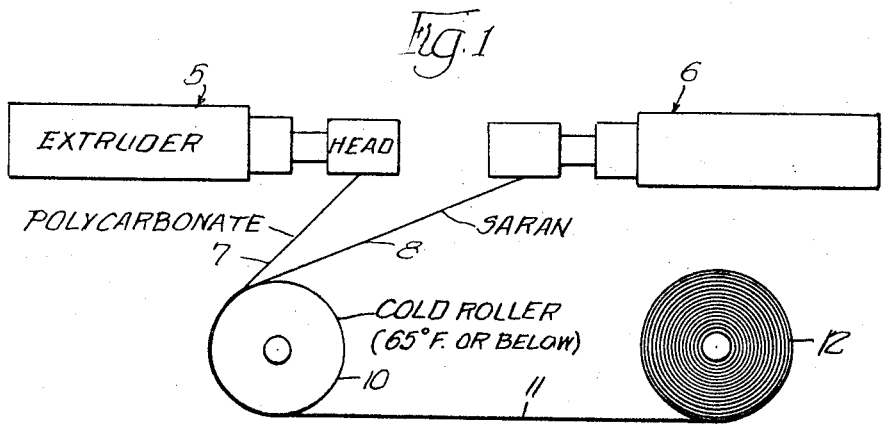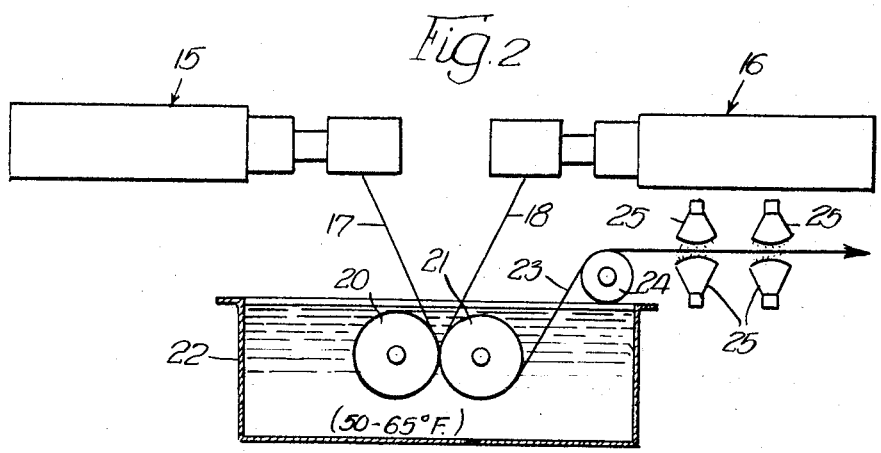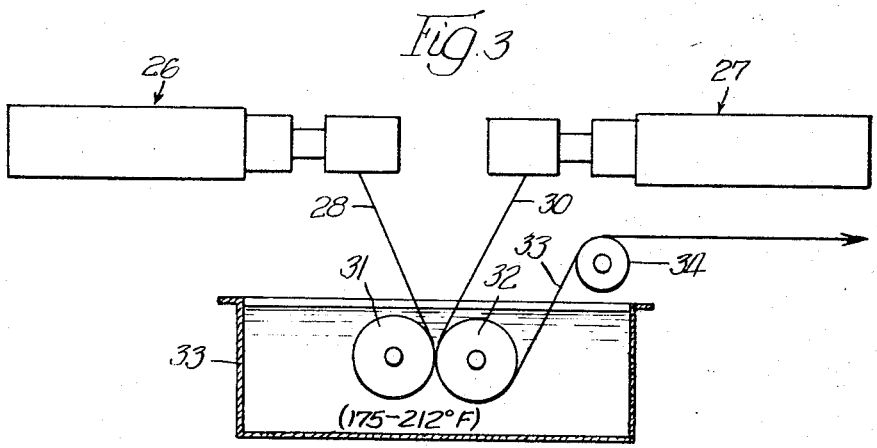

3,420,679
LAMINATED FILM, METHODS OF MAKING SAME AND PACKAGES FORMED THEREFROM
Maurice J. Gifford and Paul E. Grindrod, Madison, Wis., assignors to Oscar Mayer & Co., Inc., Chicago, Ill., a corporation of Illinois
Filed Nov. 10, 1965, Ser. No. 507,150
U.S. Cl. 99—171         8 Claims
Int. Cl. B29d 9/00; B32b 27/08

ABSTRACT OF THE DISCLOSURE

Saran film in the amorphous or supercooled condition is directly combined or laminated to a ply or film of polycarbonate resin without the use of any intermediate adhesive or activating solvent. The saran film is selected to have outstanding barrier properties with respect to air and moisture transmission. The polycarbonate film provides excellent mechanical characteristics to the resulting laminate, both at below-freezing temperatures and at elevated temperatures. The resulting laminates are especially useful for packaging of foods and hermetic seals can be readily formed between saran-to-saran plies or between saran and polycarbonate plies.

---

This invention relates to innovations and improvements in laminated films, food packages made therewith, and methods of making such laminations, wherein a ply of saran resin is laminated directly to a ply of polycarbonate resin.

In the past a variety of films formed from synthetic resins or film-forming materials have been used for packaging foods and other products. One of the most important and successful films has been formed of saran resins which are basically polyvinylidene chloride resins which usually contain minor proportions of vinyl chloride copolymerized therewith. One outstanding property of saran films in comparison with other synthetic films is their excellent resistance to transmission of or permeation by oxygen or air and moisture. A unique property of saran films is their ability to form permanent autogenous welds or bonds when pressed together in their so-called supercooled condition. Furthermore, when saran film is in the supercooled condition it is extremely formable and adapted to follow in detail the contours of various shaped bodies to be packaged therein. Saran films are also highly transparent, nontoxic and therefore acceptable for packaging foods, and they are competitive in cost with other commercial synthetic films for packaging.

Despite the unique and many excellent properties of saran film it has one shortcoming, namely, its relatively poor mechanical characteristics, especially its low flexibility and tendency to crack, at low temperatures, such as subfreezing temperatures required for storage of frozen foods. One approach to the problem created by this shortcoming of saran as a packaging film has been to laminate a ply of saran formulated to have optimum mechanical properties at low temperature but under-maximum air and moisture barrier properties with a ply of saran formulated to have maximum air and moisture barrier properties but under-maximum low temperature properties.

Another approach, which may be combined with the foregoing approach is to employ a ply formed of a different resin material. However, adhesives or solvents have been required when a ply of saran is laminated to a ply of a different resin.

The following patents to Sloan, Eberman and Jensen disclose methods of using saran film for packaging purposes and for taking advantage of its sealing properties in the supercooled condition, including apparatus for extruding, laminating and automatically forming packages therewith: 3,083,106, 3,129,545, 3,189,505 and 3,195,288. The production and certain properties of saran, and its supercooled condition, are described in Wiley Patents 2,183,602, 2,233,442, 2,329,571, 2,348,772 and 2,390,035; and in Cheney et al. Patents 2,769,206 and 2,878,154.

In accordance with the present invention it has been discovered that a superior and outstanding laminated film for packaging purposes can be obtained by directly laminating (i.e., without use of adhesives or activating solvents) saran film in the amorphous or supercooled condition to a film of polycarbonate resin either preformed or freshly extruded. Films formed of polycarbonate resin themselves have many excellent properties which suit them for many food packaging purposes but they are outstanding in respect to their mechanical properties particularly at subzero temperatures on the one hand and at temperatures up to the boiling point of water on the other hand.

Heretofore, it has been proposed to utilize polycarbonate resin films by themselves for packaging purposes as disclosed in Patent No. 2,964,797, dated Dec. 20, 1960. However, the resistance of polycarbonate films to permeation or penetration or transmission or air or oxygen is not adequate for forming hermetic food packages with adequately long shelf lives. For this reason it has previously been the practice to coat polycarbonate films with either saran emulsions or lacquers. When saran emulsions are employed, at least two coatings are required in order to eliminate pinholes in the saran coating that is deposited. When saran lacquers are employed, the solvents are absorbed by the polycarbonate film, producing odors which are difficult to eliminate.

It has also been proposed to laminate preformed, crystallized saran films with polycarbonate film but this requires the use of adhesives or solvents to secure the necessary adhesion.

In accordance with the present invention it was discovered that there are several techniques by which saran film in the amorphous or supercooled condition can be directly combined or laminated with a ply or film formed of polycarbonate resin without the use of intermediate adhesives or activating solvents.

As is brought out in the above mentioned Sloan et al. patents, when saran resin is heated to its melting or fusion point and then extruded, the film is amorphous, i.e., noncrystalline. Thereafter, crystals begin to form on cooling and the rate of formation is a matter of time and temperature, the rate being relatively rapid at high temperatures. However, if the freshly extruded hot saran film is chilled, such as to room temperature in a cold water bath, the rate of crystal formation is greatly retarded and the film remains in the amorphous noncrystalline condition for a substantial period of time in the chilled condition. This condition obtained by rapid chilling from the hot fused condition is referred to as the "supercooled condition."

If an extruded saran film is not worked (i.e., stretched) to any material degree in the amorphous condition, when the crystals do form therein as they ultimately will, the crystals will not be oriented but will exhibit substantially random distribution throughout.

As long as saran is in the amorphous, noncrystalline condition, whether freshly extruded and hot, or supercooled, it will exhibit the above mentioned unique property of forming autogenous or permanent welds or fused bonds when pieces of saran are brought together surface to surface.

One primary object of the present invention is the provision of a laminated film for hermetically packaging of foods and other products which require protection from contact with or exposure to air or moisture and which comprises a ply of saran resin exhibiting substantially random crystallization throughout laminated directly (i.e., without the use of adhesives or activating solvents) to a ply of polycarbonate resin.

A further important object of the invention is the provision of food packages, including hermetic frozen food packages, which retain their mechanical properties to an adequate degree at subfreezing temperatures and also at temperatures up to the boiling point of water, with the packaging material being formed of the above mentioned laminate of nonoriented saran film and polycarbonate film.

Another important object of the invention is the provision of methods of laminating either a preformed or a freshly extruded film or ply of polycarbonate resin directly to a ply of saran resin in the amorphous or supercooled condition.

Certain other objects of the invention will, in part, be obvious and will in part appear hereinafter.

For a more complete understanding of the nature and scope of the invention reference may now be had to the following detailed description thereof taken in connection with the following illustrative working examples and accompanying drawings wherein:

FIG. 1 is a diagrammatic view illustrating apparatus and a procedure wherein films of polycarbonate resin and saran resin are freshly extruded and simultaneously laminated by being combined on a cold roller, this being one manner in which the films can be combined in accordance with the present invention;

FIG. 2 is a diagrammatic view showing another form of apparatus and illustrating another method in which freshly extruded films of polycarbonate and saran resins may be laminated in accordance with the present invention;

FIG. 3 illustrates still another method and apparatus for laminating freshly extruded films of polycarbonate and saran resin;

Figure 4:
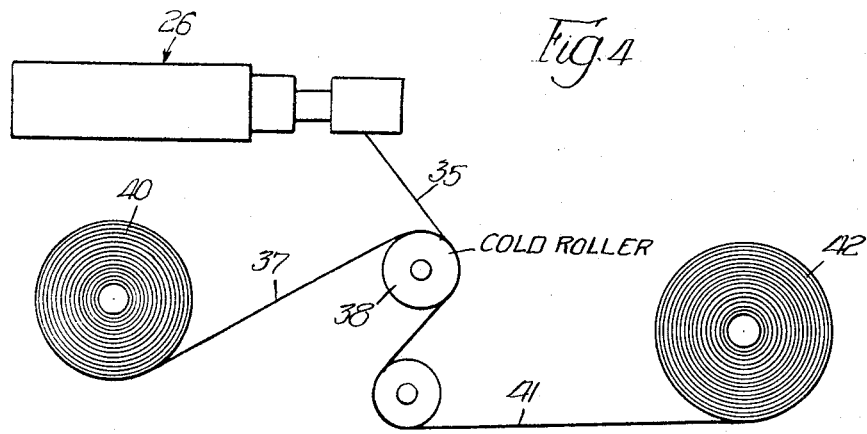
Figure 5:
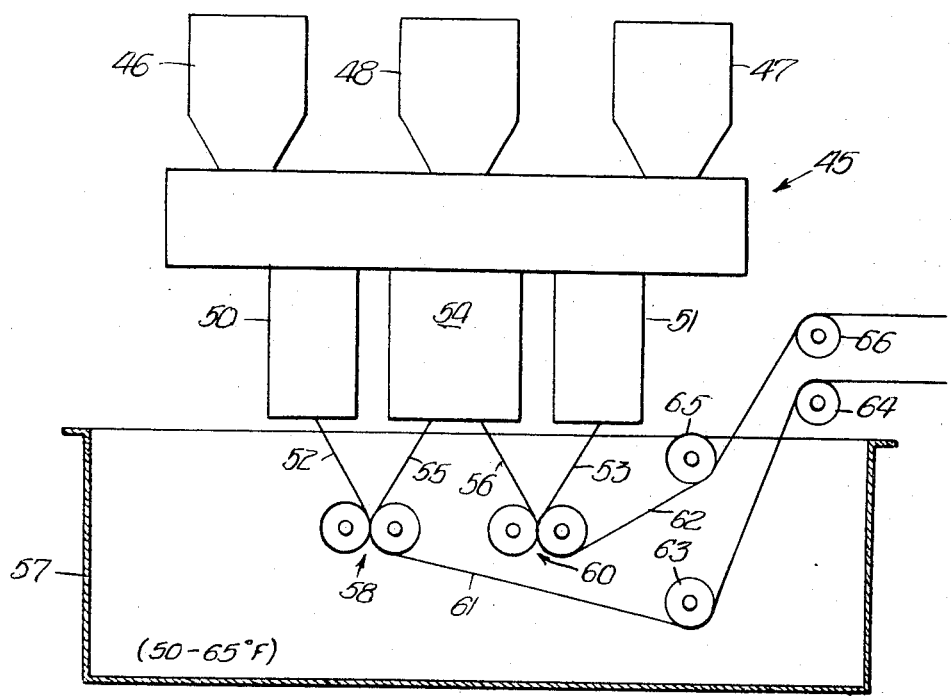

FIG. 4 illustrates an apparatus in which freshly extruded saran film may be laminated on a cold roller to preformed polycarbonate film; and FIG. 5 illustrates an apparatus and method wherein two separate laminated films of polycarbonate and saran resins are formed in accordance with the method illustrated in FIG. 3 so that the two laminated films may be used as the upper and lower films in accordance with the apparatus disclosed in the Sloan et al. patents referred to above.

The principles of the present invention are applicable generally to films formed from saran resins and from polycarbonate resins. That is to say, the invention is not restricted to either certain saran resins or certain polycarbonate resins, although certain resins of both types will usually be preferred for commercial reasons.

Saran resins useful in practicing the present invention are disclosed, for example, in the above mentioned Sloan et al. Patents Nos. 3,083,106, 3,129,545, 3,189,505 and 3,195,288. Since the ply of polycarbonate film will be relied on to supply the mechanical properties of the laminate at low temperatures the ply of saran resin may be one chosen for its excellent air and moisture resistance. Saran resins are commercially available from Dow Chemical Company, Midland, Mich.

Polycarbonate resins, which are useful in practicing the present invention are described in the Patents Nos. 2,964,797 and 3,117,046 and are commercially available under the proprietary name Lexan from General Electric Company, Schenectady, N.Y.

Referring to FIG. 1 two continuous film extruders of known type are represented at 5 and 6. In well known manner extruder 5 may be fed with a commercially available pulverized polycarbonate resin such as Lexan No. 144 and continuously extruded at a temperature of about 500° F. through a die opening which provides an extruded film 7 which is 8 inches wide and 1.0 mils thick. At the same time, the extruder 6 is fed pulverized saran resin formulated to have excellent moisture and oxygen barrier resistance (e.g., a copolymer of 90% vinylidene chloride and 10% vinyl chloride). The saran film 8 as extruded may have a temperature of 375° F. and can have the same width and thickness as the polycarbonate film 7.

The films 7 and 8 are continuously extruded onto a rotating cold roller 10 which is a known piece of equipment used by manufacturers of plastic film. It has internal cooling means whereby the highly polished metal surface may be maintained at the desired temperature (e.g., 50° F.). As shown in FIG. 1 the saran film 8 is extruded directly onto the cold roller 10 while the polycarbonate film 7 is extruded onto the saran film. However, this relationship of the films 7 and 8 can be reversed. With the saran film 8 being in the amorphous noncrystalline condition it will laminate directly to the hot polycarbonate film 7 with the laminate being indicated at 11. The bond formed between the films 7 and 8 will be continuous and inseparable for practical purposes. The laminate 11 may be either used directly for package forming or any other desired purpose, or it may be wound up into roll form as indicated at 12. In order to prevent blocking in the roll 12, the laminate 11 should not be wound up on itself until the condition of the saran ply 8 is such that it will not form a new bond or stick (i.e., block) when contacted with the polycarbonate ply during winding on the roll 12. The non-blocking condition can be achieved by allowing sufficient time lapse for the laminate 11 to travel between the cold roll 10 and the wind up roll 12. The time lapse can be shortened by heating the laminate to accelerate crystallizing of the saran ply.

Referring now to FIG. 2, extruders 15 and 16 for extruding films of polycarbonate resin 17 and saran film 18 respectively are shown with the films passing between a pair of pressure rollers 20–21 disposed in a bath of cold water 22 wherein the temperature is preferably at or below 65° F. (e.g., from 50 to 65° F.). The saran film 18 is rapidly chilled and supercooled at this temperature and readily adheres directly to the film of polycarbonate resin. The laminate 23 is directed out of the bath 22 over a guide roller 24 and passes between upper and lower infrared heaters 25—25 which heat the film to a temperature in the range of from 250°–350° F. In this temperature range the supercooled saran film is rapidly converted to the crystalline condition with the crystals being in substantially random distribution. After passing through the heaters 25—25 the laminated film can be either used directly for packaging (it is thermoplastic and can be heat sealed) or it can be wound into roll form and stored for future use.

In FIG. 3 extruders 26 and 27 are indicated for extruding polycarbonate and saran films 28 and 30 respectively which are combined on being passed between combining or pressure rollers 31 and 32 disposed in a hot water bath 33 wherein the water temperature desirably ranges from 175°–212° F. The laminated film 33 is directed out of the bath over roller 34 and is in a condition for either immediate use or for winding into rolls for future use.

It has also been found that saran film in the amorphous or supercooled condition will laminate directly to polycarbonate resin film that has been preformed as distinguished from being freshly extruded. Referring to FIG. 4 a film 35 of saran is shown being continuously extruded by an extruder indicated at 36 directly onto a preformed (i.e., not freshly extruded) polycarbonate resin film 37 as the latter passes over a cold roller 38. The polycarbonate resin film 37 is unwound from a supply roll 40. The laminate 41 may be either used for packaging directly or it may be wound into a roll 42 for future use.

In FIG. 5 there is illustrated an extruding and combining or laminating apparatus for saran to polycarbonate resin films which corresponds generally to that illustrated diagrammatically in FIG. 1A of Sloan et al. Patents 3,083,106 and 3,195,288. The extruder apparatus is indicated generally at 45 having two polycarbonate resin hoppers 46 and 47 on the ends and an intermediate saran resin hopper 48. Extruder heads 50 and 51 are provided on the ends for the polycarbonate resin films 52 and 53. There is an intermediate extruder head 54 having two die openings for extruding saran films 55 and 56.

The saran and polycarbonate resin films are extruded into a cold water bath indicated generally at 57 with each pair of films 52–55 and 53–56 passing between pairs of combining rolls indicated generally at 58 and 60 respectively. The resulting laminated films are indicated at 61 and 62. The laminated film 61 is guided from the bath 57 by guide rollers 63 and 64 while the laminate 52 is guided by guide rollers 66 and 66. It will be noted that as the laminated films 61 and 62 leave the bath 57 the saran plies face each other.

The laminates 61 and 62 may be handled in a packaging machine as described in Sloan et al. Patents 3,083,106 and 3,195,288 for the saran to saran film laminates 37 and 38 (FIG. 1A of each patent). Since the saran plies of the polycarbonate-saran laminates 61 and 62 in FIG. 5 will still be in the supercooled condition, packages with permanent, hermetic seal areas can be formed by employing apparatus such as that described in the Sloan et al. patents.

If desired, instead of having the saran plies facing each other for seal forming purposes as described in connection with FIG. 5, one of the laminates could be in effect reversed or inverted so that the supercooled saran ply in the amorphous noncrystalline condition of one laminate 61 or 62 would seal directly to the polycarbonate resin ply of the other laminate.

It will be further understood that by application of heat seal bars, dielectric heating means, or other heating means, the laminates may be sealed with the polycarbonate resins plies facing each other and forming the heat sealed bond. However, since the polycarbonate resin film provides the superior mechanical properties, especially at the extreme ranges of temperature to which a package may be subjected, while the saran resin film provides primarily the resistance to permeation by air, oxygen and moisture, and since the saran-to-saran seals are so satisfactory, the packaging operations will normally be carried out in such a way that the seal areas are formed by the saran film plies being brought into sealing engagement.

It will be understood that while polycarbonate-saran laminates made in accordance with the present invention may be used for various types of packaging generally, that these laminates have particular utility where it is desired to form hermetically sealed packages of food and other perishable products which will be subjected to a wide range of temperatures in storage and use. For example, these laminated films may be utilized for packaging food products of the type which will first be stored for long periods in a freezer and then introduced directly in the package in boiling water and heated so as to be ready for serving.

We claim:
1. A laminated film for packaging comprising a ply of saran resin in substantially the random, nonoriented crystalline state laminated directly to a ply of polycarbonate resin.
2. A hermetic frozen food package adapted to be stored at subfreezing temperatures and also to be heated in boiling water prior to opening comprising a food product packaged in the laminated film of claim 1.
3. A hermetic food package wherein the packaging material is a laminated film as called for in claim 1 and wherein the sealed areas consist of saran sealed directly to saran.
4. A hermetic food package wherein the packaging material is a laminated film as called for in claim 1 and wherein the sealed areas consist of a ply of polycarbonate from one laminate sealed directly to a ply of saran from another laminate.
5. The method of making a laminated film comprising a ply of saran resin laminated directly to a ply of polycarbonate resin which comprises simultaneously extruding plies of saran resin and polycarbonate resin in superposed relationship on a cold roller.
6. The method of making a laminated film comprising a ply of saran resin laminated directly to a ply of polycarbonate resin which comprises simultaneously extruding plies of saran resin and polycarbonate resin into a cold water bath, laminating the extruded films by passage between pressure rollers in said bath, and thereafter heating said laminate to a temperature between about 250° F. to about 350° F.
7. The method of making a laminated film comprising a ply of saran resin laminated directly to a ply of polycarbonate resin which comprises simultaneously extruding plies of saran resin and polycarbonate resin into a hot water bath having a temperature of from about 175° F. to about 212° F., and laminating the extruded films by passage between pressure rollers in said bath.
8. The method of making a laminated film comprising a ply of saran resin laminated directly to a ply of polycarbonate resin which comprises laminating said ply of saran resin while in the amorphous condition directly to a preformed film of polycarbonate resin.

References Cited
UNITED STATES PATENTS

| | | | |
|---|---|---|---|
| 2,409,521 | 10/1946 | Wiley | 264—85 |
| 2,679,969 | 6/1954 | Richter | 229—3.5 |
| 2,686,744 | 8/1954 | Cornwell | 161—260 |
| 2,964,797 | 12/1960 | Peilstocker et al. | 264—205 |
| 3,037,868 | 6/1962 | Rosser | 99—171 |
| 3,117,046 | 1/1964 | Klockgether et al. | 156—304 |
| 3,341,391 | 9/1967 | Hamilton et al. | 161—3 |

FOREIGN PATENTS 234,498  8/1959  Australia.

A. LOUIS MONACELL, *Primary Examiner.*

JAMES HOFFMAN, *Assistant Examiner.*

U.S. Cl. X.R.

156—244, 306, 311; 161—183, 247